(12) United States Patent
Bergamo

(10) Patent No.: US 6,574,268 B1
(45) Date of Patent: *Jun. 3, 2003

(54) ASYMMETRIC ORTHOGONAL CODES FOR OPTICAL COMMUNICATIONS

(75) Inventor: Marcos Antonio Bergamo, Wellesley, MA (US)

(73) Assignee: BBNT Solutions LLC, Cambridge, MA (US)

(*) Notice: Subject to any disclaimer, the term of this patent is extended or adjusted under 35 U.S.C. 154(b) by 35 days.

This patent is subject to a terminal disclaimer.

(21) Appl. No.: 09/718,154

(22) Filed: Nov. 21, 2000

(51) Int. Cl.[7] ............................................... H04B 10/12

(52) U.S. Cl. ..................... 375/142; 375/145; 375/146; 375/149; 375/150; 359/136; 359/154

(58) Field of Search .................................. 375/130, 140, 375/141, 142, 144, 147, 148, 150; 370/342; 359/124, 136, 154

(56) References Cited

U.S. PATENT DOCUMENTS

| | | | | |
|---|---|---|---|---|
| 5,757,845 A | * | 5/1998 | Fukawa et al. | 370/342 |
| 5,760,941 A | | 6/1998 | Young et al. | 359/181 |
| 5,841,776 A | | 11/1998 | Chen | 370/441 |
| 5,936,754 A | | 8/1999 | Ariyavisitakul et al. | 359/145 |
| 6,084,884 A | * | 7/2000 | Adachi | 370/203 |
| 6,091,760 A | * | 7/2000 | Giallorenzi et al. | 370/208 |
| 6,236,483 B1 | * | 5/2001 | Dutt et al. | 359/136 |

* cited by examiner

Primary Examiner—Amanda T. Le
(74) Attorney, Agent, or Firm—Leonard Charles Suchyta; James K. Weixel

(57) ABSTRACT

A system (101–139) receives a transmitted optical signal and generates an orthogonal despreading code that is different than the code used to spread the transmitted signal. The system (101–139) then despreads the received signal using the despreading code. By using a code to despread the received signal that is different than the code used to spread the signal, the overall interference in the system can be reduced and even eliminated.

36 Claims, 5 Drawing Sheets

ASYMMETRIC ORTHOGONAL CODES FOR OPTICAL COMMUNICATIONS

FIELD OF THE INVENTION

The present invention relates generally to communication systems and, more particularly, to systems and methods that use asymmetric pairs of mutually orthogonal codes for spreading and despreading transmissions in point-to-point, point-to-multipoint, and multiple access optical communication systems.

BACKGROUND OF THE INVENTION

A major area of development in optical communications using fiber or directly over the air transmissions involves the implementation of multiple access techniques, where multiple users share the same communication channel. Multiple access techniques that have been implemented in optical networks include the Waveform Division Multiple Access (WDMA) and Time Division Multiple Access (TDMA) techniques.

In WDMA, the network partitions the bandwidth into non-overlapping wavelength (i.e., color) segments (or channels) and allocates the segments to the users in a predetermined manner. In dedicated allocations, each user has the interference-free use of his allocated bandwidth segment at all times. One problem with dedicated wavelength allocation is that if the user's access to the network is bursty, WDMA may not efficiently utilize the existing bandwidth. Moreover, as new users are added, the network re-allocates the bandwidth resource, which may be neither feasible nor desirable in large-scale networks.

A usual practice is to allocate a wavelength channel to multiple users and use TDMA to control the shared utilization of the wavelength channel bandwidth. In TDMA, the network allocates non-overlapping, time slots to the users so that each has the interference-free use of the entire wavelength channel bandwidth during his allocated time slot. By increasing the number of time slots, new users can be accommodated. Like WDMA with dedicated allocations, the TDMA protocol may lead to inefficient bandwidth utilization in a bursty network. Each user has a very short duty cycle transmission period that requires time slot synchronization for proper operation. Since only one user is allowed to access the network at any time instance, the TDMA protocol is essentially a coordinated, single user system.

A current trend in the industry is to integrate WDMA and TDMA with Code Division Multiple Access (CDMA) spread spectrum communications. CDMA is a type of spread spectrum technique that allows signals from multiple users assigned to a common wavelength channel to overlap in time by assigning different spreading codes to different users. More specifically, CDMA systems "spread" signals across a common communication channel by multiplying each signal with a unique spreading code sequence. A transmitter then transmits the signal on the common channel in overlapping fashion as a composite signal. In CDMA systems using conventional "symmetric" spreading-and-despreading sequences, each receiver correlates the composite signal with a respective unique despreading code sequence that is an exact replica of the spreading code sequence used to spread the signal at the transmitter to extract the signal addressed to it.

In conventional optical fiber CDMA communication systems, multiple users transmit simultaneously using binary signaling and non-coherent ON-OFF optical transmission techniques in which the presence of light energy (or the lack thereof) is used to signal the spread sequence "chips" as being either "1" or "0." These multiple signals, being available superposed at different receivers with different relative power levels and relative delays, are non-orthogonal to each other.

Receivers use correlation operations to despread and separate the received signals. The use of such correlation operations, however, results in signals being received with large amounts of cross-correlation interference. In order to reduce and even eliminate the amount of associated interference, it is desirable to create a spread spectrum optical communication system in which the orthogonal nature of the codes is maintained at the receivers regardless of the nature of transmissions (coherent or not), relative delays and power levels associated with these signals.

Therefore, there exists a need for a system and method that reduce interference in spread spectrum optical transmissions.

SUMMARY OF THE INVENTION

Systems and methods consistent with the present invention address this and other needs by providing a mechanism that reduces the interference of spread spectrum transmissions in an optical multiple-access network by using despreading codes that are different (i.e., asymmetric) and orthogonal to the codes used for spreading.

A method for processing a signal in an optical network includes generating a spreading matrix having a plurality of spreading codes, spreading a signal using one or more spreading codes from the spreading matrix, converting the spread signal to an optical signal, and transmitting the optical signal through the optical network. The method further includes converting the optical signal back to the spread signal, generating a despreading matrix that is an inverse of the spreading matrix and includes a plurality of despreading codes, despreading the spread signal using one or more despreading codes from the despreading matrix, and processing the despread signal.

In another implementation consistent with the present invention, a receiver includes an optical-to-electrical converter, a despreading code generator, and a correlator. The optical-to-electrical converter is configured to receive a transmitted optical signal and convert the optical signal to a digital signal. The despreading code generator is configured to generate at least one orthogonal despreading code, the at least one orthogonal despreading code being different than a code used to spread the transmitted optical signal. The correlator is configured to receive the digital signal and the at least one orthogonal despreading code, and despread the digital signal using the at least one orthogonal despreading code.

In yet another implementation consistent with the present invention, a system includes first and second optical transmitters. The first optical transmitter is configured to generate a spreading code matrix, rows of the spreading code matrix corresponding to different spreading codes, allocate a first group of spreading codes in the spreading code matrix to a first signal to be transmitted, spread the first signal using the first group of spreading codes, convert the spread first signal to an optical form, and transmit the optical first signal. The second optical transmitter is configured to generate the spreading code matrix, allocate a second different group of spreading codes in the spreading code matrix to a second signal to be transmitted, the second different group being allocated such that a third group of unassigned spreading codes is located between the allocated first group and second different group of spreading codes, spread the second signal using the second different group of spreading codes, convert the spread second signal to an optical form, and transmit the optical second signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide a mechanism that reduces the overall interference in an optical communication network. A transmitter spreads data to be transmitted using a spreading code. The transmitter generates a spreading code having a format that allows for optical signal transmission using non-coherent ON-OFF modulation. The transmitter encodes the user data using one or more codes of a spreading code matrix. A receiver, consistent with the present invention, receives signals from multiple transmitters, each with its own relative power level and delay. The receiver decodes and separates the signals from the various users using a despreading code matrix that is orthogonal to the spreading code matrix.

EXEMPLARY COMMUNICATIONS NETWORK

Figure 1:
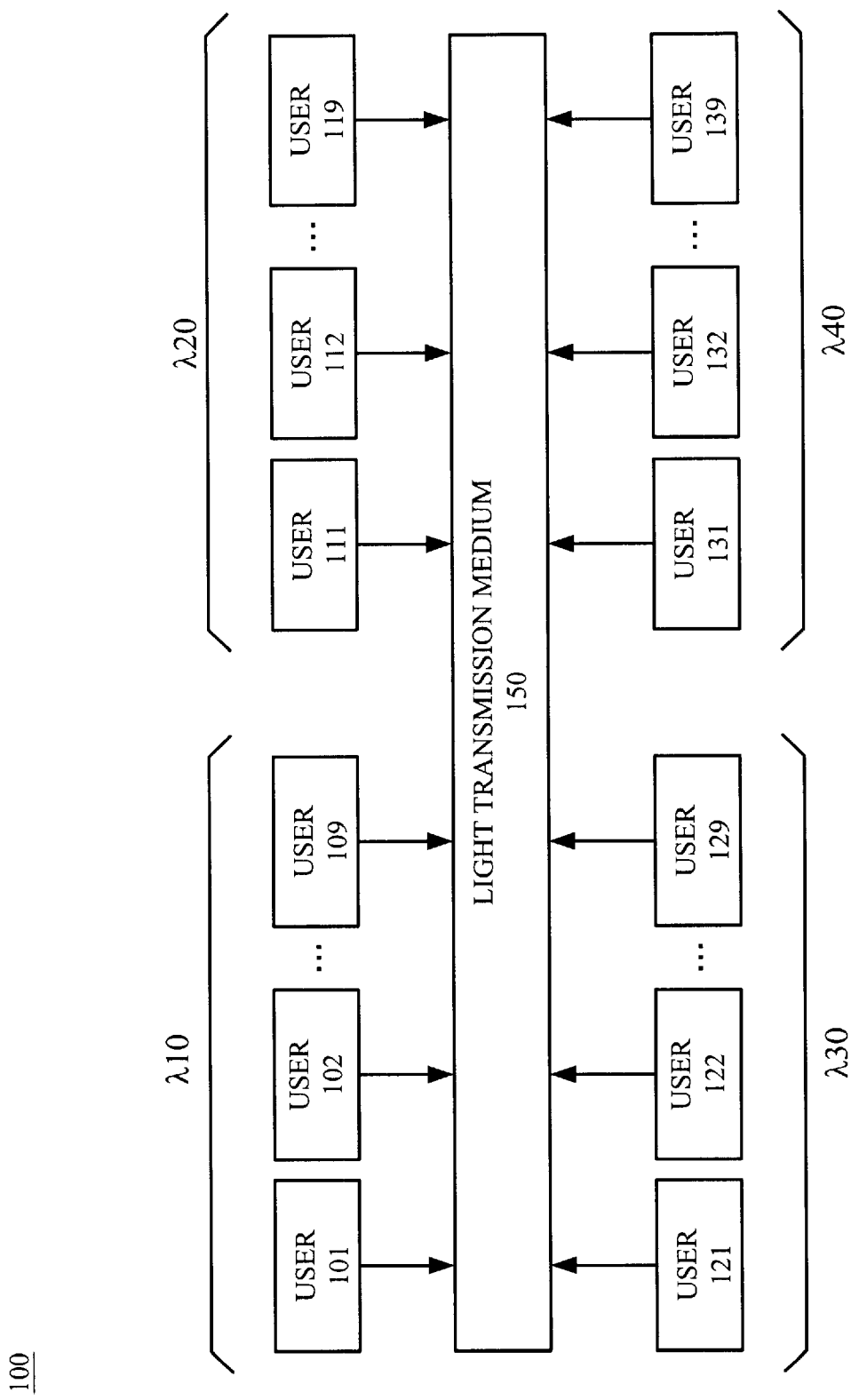
FIG. 1 illustrates an exemplary optical communication network in which systems and methods, consistent with the present invention, may be implemented.

FIG. 1 illustrates an exemplary optical communication network 100 in which systems and methods, consistent with the present invention, may be implemented. In FIG. 1, network 100 includes a light transmission medium 150 and several optical user terminals 101–139.

The light transmission medium 150 includes any conventional fiber optic network or any "fiberless" over-the-air network that is capable of carrying optical signals. It will be assumed hereafter that the light transmission medium 150 is a fiber optic medium. It will be appreciated, however, that the techniques described herein are equally applicable to an over-the-air fiberless light transmission medium.

The user terminals 101–109, 111–119, 121–129, and 131–139 may include any type of device capable of transmitting and receiving information via the fiber optic medium 150 using an optical transmitter and receiver tuned to the wavelength channels $\lambda 10$–$\lambda 40$, respectively. The user terminals 101–139 may be allocated to different wavelength channels ($\lambda 10$–$\lambda 40$), each wavelength channel using different light colors and, possibly, different bandwidths. The signals in different wavelength channels may be orthogonal. The exemplary asymmetric orthogonal CDMA system can operate in any of the wavelength channels available. It will be appreciated that any technique described herein for a specific wavelength channel is equally applicable to any other wavelength channel. It will be assumed hereafter that the user terminals 101–109 transmit signals over the fiber optic medium 150 in the wavelength channel $\lambda 10$ using asymmetric orthogonal spread spectrum communication techniques.

EXEMPLARY TRANSMITTER AND RECEIVER CONFIGURATIONS

Figure 2:
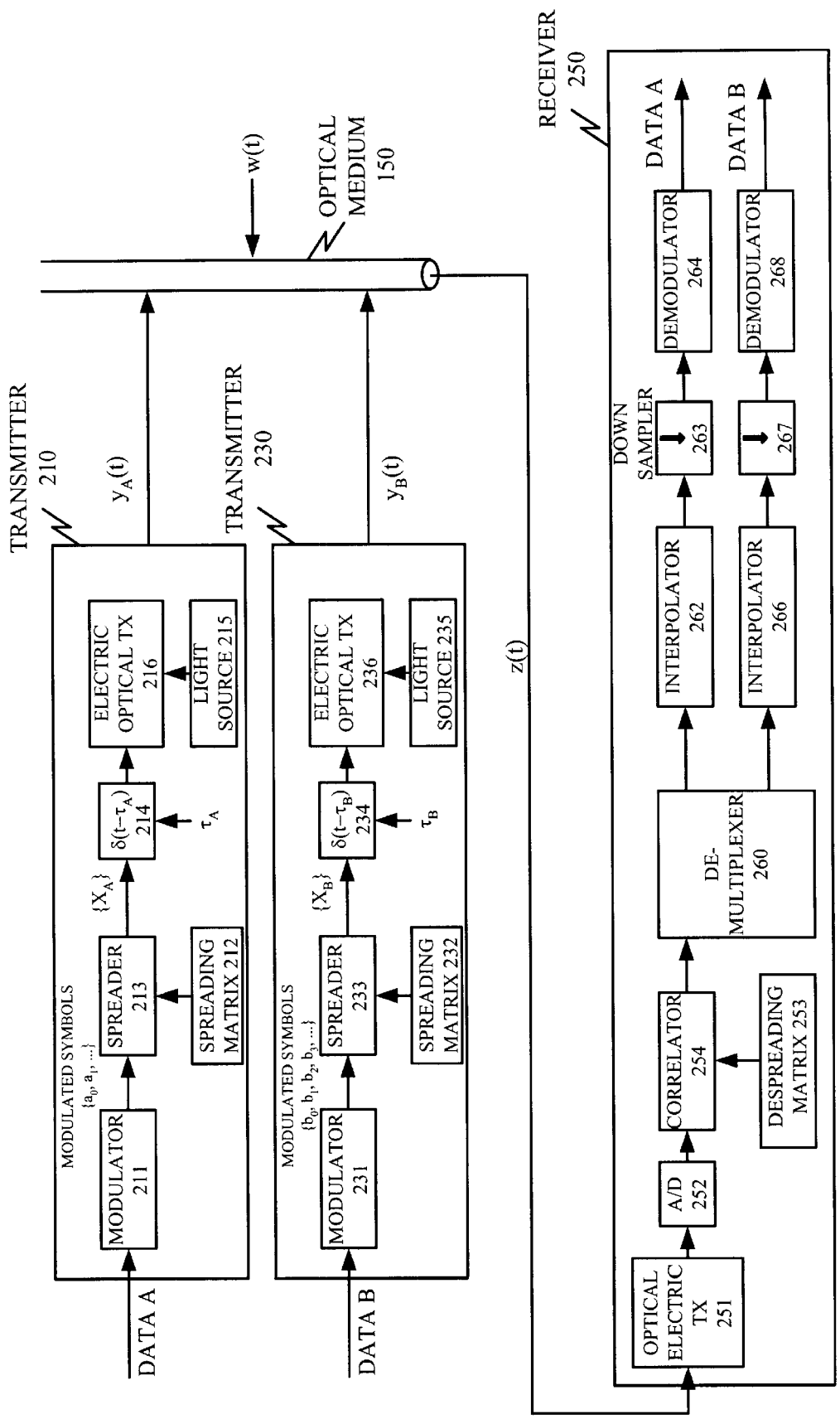
FIG. 2 illustrates exemplary transmitter and receiver configurations consistent with the present invention.

FIG. 2 illustrates exemplary transmitter 210 and 230 and receiver 250 configurations consistent with the present invention. Transmitter 210 may, for example, be associated with user terminal 101, transmitter 230 may be associated with user terminal 202, and receiver 250 may be associated with user terminal 109. The exemplary transmitters 210 and 230 and receiver 250 may be implemented via hardware or a combination of hardware and software. Operation in a selected wavelength channel requires the use of fixed or tunable light sources and electrical-optical transceivers (TX) at the transmitters 210 and 230, respectively, and a wavelength division demultiplexer at the receiver 250.

Transmitter 210 may include a data modulator 211, a spreading matrix generator 212, a modulated symbol spreader 213, a channel-equivalent filter 214 possibly resulting from the combination of the transmitter filter, wavelength channel and receiver filters, light source 215, and electrical-optical transceiver 216. Transmitter 230 may include modules 231–234 similar to those described above with respect to transmitter 210. The channel-equivalent filters 214 and 234 may not necessarily be identical since the corresponding channels from the transmitters 210 and 230 to the receiver 250 may have different propagation characteristics (e.g., different propagation lengths). It will be appreciated that the transmitters 210 and 230 may include additional devices (not shown) that aid in the transmission or processing of information.

In the transmitter 210, the modulator 211 receives a binary data signal A to be transmitted. The data signal A may be composed of a sequence of packets, each packet with bits from different signals (e.g., a voice signal, data signal, or video signal). Each signal may have to be transmitted using different power levels and different modulation levels (i.e., number of bits per symbol) to meet the bit error rate (BER) requirement of each type of signal. The modulator 211 may include several mechanisms (not shown) that transform the sequence of bits into a sequence of modulated symbols {$a_1$, $a_2$, . . . } according to the selected modulation level and average power per packet. The modulator 211 may, for example, modulate the data signal using multi-level pulse amplitude modulation (M-ary PAM) with non-negative levels.

The spreader 213, as will be described in more detail below, may generate the digital signal to be transmitted {$X_A$} by segmenting the sequence of modulated symbols into fixed-length blocks, and then multiplying each symbol of each segment or block by assigned codes of the spreading matrix generated by the spreading matrix generator 212. In an implementation consistent with the present invention, the spreading matrix generator 212 provides a spreading matrix having non-negative numbers (e.g., 0's and 1's).

The spreader 213 transfers the spread signal to the channel-equivalent filter 214 for processing in a well-known manner. The transmitter 210 may include a conventional light source 215 and electrical-to-optical transceiver 216 that transform the baseband modulated signal into an optically-modulated signal at wavelength λ10 in a well-known manner. Since the spreader 213 uses a matrix with non-negative numbers (e.g., 0's and 1's) to spread the modulated data signal, the resulting transmitted signal can be conveyed over the fiber medium 150 using ON-OFF non-coherent power-based light modulation. Also, as will be apparent later, when the spreading codes are non-binary, when a transmitter is assigned to more than one code, or when the channel bandwidth is limited, the resulting transmitted light power levels may vary with time within the length of the spreading codes. The transmitter 210 may include additional light power amplifiers and other medium interface components (not shown) capable of transmitting light signals over the fiber medium 150 or over the air.

When coherent light modulation is used instead of ON-OFF non-coherent modulation, the techniques described herein may include more power-efficient data modulation techniques, such as Multiple Level Phase Modulation or M-ary phase shift keying (PSK) and Multiple Level Quadrature-Phase Amplitude Modulation (QAM) or M-ary QAM. Moreover, with coherent light modulation, the spreading sequences are not limited to having non-negative real values. In fact, the spreading (and the despreading) sequences may include complex values with the real and imaginary parts of the resulting signal being transmitted, respectively, using the in-phase and quadrature-phase components of the coherent light signal.

The transmitter 230 generates its optically-modulated signal in a similar manner using a different set of codes from the spreading matrix 232.

The signals from transmitters 210 and 230 may use the same wavelength channel λ10 and, after being subjected to different propagation delays, may be received superposed in power by the receiver 250. The instantaneous power level of the superposed signal may vary in time within the length of the spreading code and may have power levels reflective of the user data symbols and number of allocated codes per terminal.

In FIG. 2, the exemplary receiver 250 may include conventional wavelength demultiplexing equipment (not shown) that separates the wavelength channel λ10 from the other wavelength channels λ20–λ40, an optical-electrical transceiver 251, an A/D converter 252, a despreading matrix generator 253, a correlator 254, a signal demultiplexer 260, signal interpolators 262 and 266, down-samplers 263 and 267, and demodulators 264 and 268. It will be appreciated that the receiver 250 may perform the above operations using hardware and/or software and may include additional devices (not shown) that aid in the reception or processing of information.

The receiver 250 may receive a composite signal from transmitters 210 and 230. The optical-to-electrical transceiver 251 and the wavelength demultiplexing equipment (not shown) generate the baseband version of the received composite signal using, for example, wavelength λ10. The A/D converter 252 may sample the composite signal at, for example, two times the Nyquist rate and transfer the sampled signal to the correlator 254.

Correlator 254 selects the receive codes to be used in conjunction with transmitters 210 and 230 from the despreading matrix 253 and uses them to despread the received composite signal. As will be described in more detail below, the despreading codes are provided in the form of a despreading matrix that is different and orthogonal to the codes used to spread the signals at transmitters 210 and 230. In this way, interference caused by signals from different transmitters with relative different propagation delays can be eliminated. Once the signal is despread, the correlator 254 transfers the despread signal for further processing by the demultiplexer 260, the interpolators 262 and 266, the down-samplers 263 and 267, and the demodulators 264 and 268 in a well-known manner.

EXEMPLARY PROCESSING

Figure 3A:
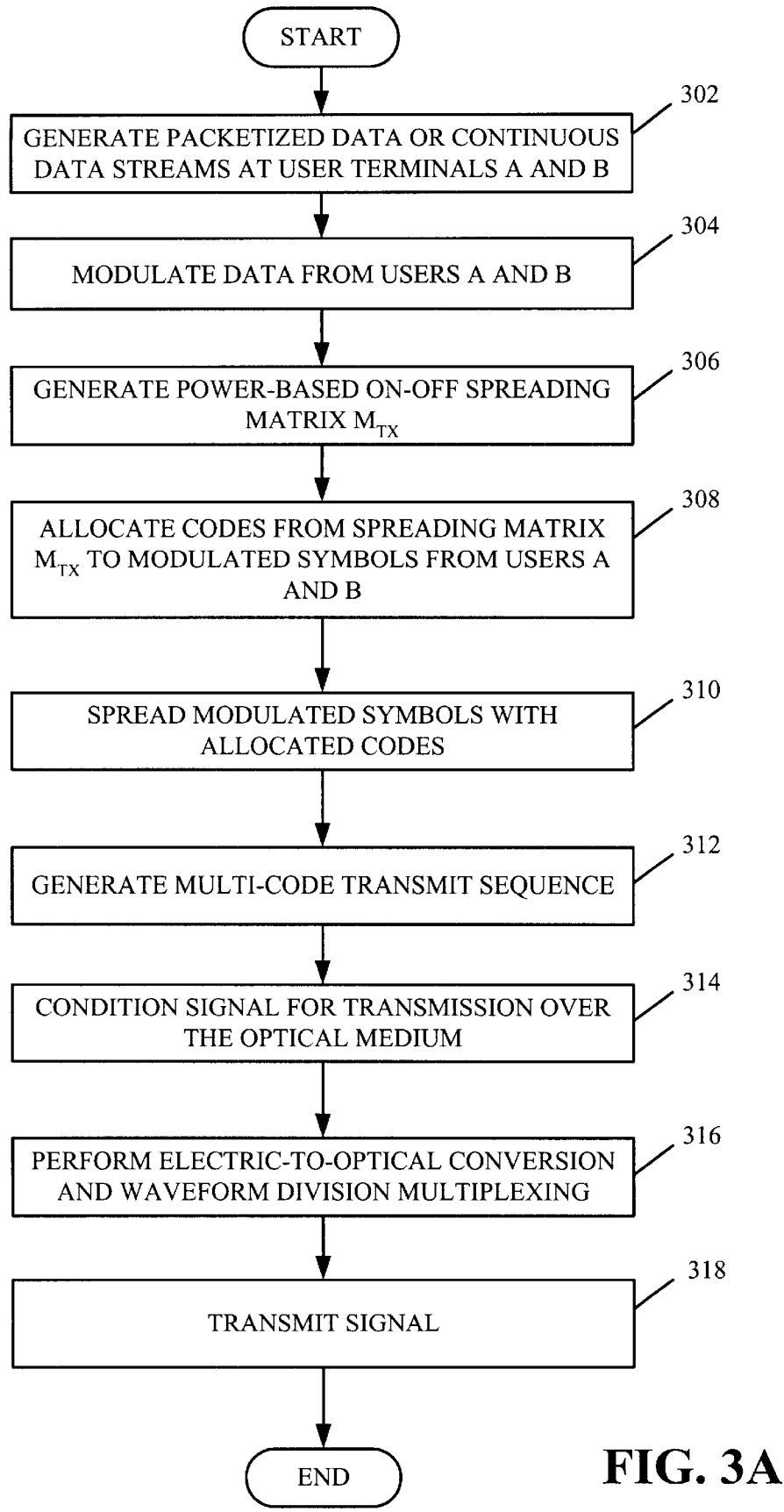
FIG. 3A illustrates an exemplary process for transmitting signals in a manner consistent with the present invention.

FIG. 3A illustrates an exemplary process for transmitting signals consistent with the present invention. Assume for simplicity that a fiber optic communication network (e.g., network 100) includes two transmitters A (e.g., transmitter 210 at user terminal 101) and B (e.g., transmitter 230 at user terminal 102) that communicate with a common receiver (e.g., receiver 250 at optical user terminal 109).

Processing may begin with the user terminals 101 and 102 generating packetized data or a continuous data stream for transmission by each user terminal's respective transmitter 210 and 230 [step 302]. The modulator 211 and 231 of each user terminal modulates the data in a well-known manner [step 304]. The process defines, for example, the modulated symbols generated by users A and B, from optical user terminals 101 and 102, respectively, with arbitrary propagation delays to the common receiver 250, as:

{$a_0$, $a_1$}

{$b_0$, $b_1$, $b_2$, $b_3$}.

Assuming that {$c_0$, $c_1$, $c_3$, $c_4$, $c_5$, $c_6$, $c_7$, $c_8$, $c_9$, $c_{10}$, $c_{11}$, $c_{12}$, $c_{13}$, $c_{14}$} represents the base spreading code sequence "C", the transmitters 210 and 230 generate, via a spreading code sequence generator 214 and 234, a spreading matrix $M_{TX}$ using circular shifts [step 306] as illustrated below:

$$M_{TX} = \begin{pmatrix} c_0 & c_1 & c_2 & c_3 & c_4 & c_5 & c_6 & c_7 & c_8 & c_9 & c_{10} & c_{11} & c_{12} & c_{13} & c_{14} \\ c_{14} & c_0 & c_1 & c_2 & c_3 & c_4 & c_5 & c_6 & c_7 & c_8 & c_9 & c_{10} & c_{11} & c_{12} & c_{13} \\ c_{13} & c_{14} & c_0 & c_1 & c_2 & c_3 & c_4 & c_5 & c_6 & c_7 & c_8 & c_9 & c_{10} & c_{11} & c_{12} \\ c_{12} & c_{13} & c_{14} & c_0 & c_1 & c_2 & c_3 & c_4 & c_5 & c_6 & c_7 & c_8 & c_9 & c_{10} & c_{11} \\ c_{11} & c_{12} & c_{13} & c_{14} & c_0 & c_1 & c_2 & c_3 & c_4 & c_5 & c_6 & c_7 & c_8 & c_9 & c_{10} \\ c_{10} & c_{11} & c_{12} & c_{13} & c_{14} & c_0 & c_1 & c_2 & c_3 & c_4 & c_5 & c_6 & c_7 & c_8 & c_9 \\ c_9 & c_{10} & c_{11} & c_{12} & c_{13} & c_{14} & c_0 & c_1 & c_2 & c_3 & c_4 & c_5 & c_6 & c_7 & c_8 \\ c_8 & c_9 & c_{10} & c_{11} & c_{12} & c_{13} & c_{14} & c_0 & c_1 & c_2 & c_3 & c_4 & c_5 & c_6 & c_7 \\ c_7 & c_8 & c_9 & c_{10} & c_{11} & c_{12} & c_{13} & c_{14} & c_0 & c_1 & c_2 & c_3 & c_4 & c_5 & c_6 \\ c_6 & c_7 & c_8 & c_9 & c_{10} & c_{11} & c_{12} & c_{13} & c_{14} & c_0 & c_1 & c_2 & c_3 & c_4 & c_5 \\ c_5 & c_6 & c_7 & c_8 & c_9 & c_{10} & c_{11} & c_{12} & c_{13} & c_{14} & c_0 & c_1 & c_2 & c_3 & c_4 \\ c_4 & c_5 & c_6 & c_7 & c_8 & c_9 & c_{10} & c_{11} & c_{12} & c_{13} & c_{14} & c_0 & c_1 & c_2 & c_3 \\ c_3 & c_4 & c_5 & c_6 & c_7 & c_8 & c_9 & c_{10} & c_{11} & c_{12} & c_{13} & c_{14} & c_0 & c_1 & c_2 \\ c_2 & c_3 & c_4 & c_5 & c_6 & c_7 & c_8 & c_9 & c_{10} & c_{11} & c_{12} & c_{13} & c_{14} & c_0 & c_1 \\ c_1 & c_2 & c_3 & c_4 & c_5 & c_6 & c_7 & c_8 & c_9 & c_{10} & c_{11} & c_{12} & c_{13} & c_{14} & c_0 \end{pmatrix}$$

When used in conjunction with ON-OFF non-coherent optical modulation, the above matrix $M_{TX}$ includes elements that are both real-valued and non-negative. With coherent optical modulation, on the other hand, the elements of the spreading matrix may be complex-valued.

The transmitters 210 and 230 assign, via a spreader 213 and 233, a number of codes from the spreading matrix $M_{TX}$ to users A and B, respectively, based on the number of modulated symbols to be transmitted from users A and B at a particular time [step 308]. For example, assuming user A transmits two symbols $\{a_0, a_1\}$, the spreader 213 associated with optical user terminal 101 assigns two codes (or rows) from matrix $M_{TX}$ to those symbols. Similarly, since user B transmits four symbols $\{b_0, b_1, b_2, b_3\}$, the spreader 233 associated with optical user terminal 102 assigns four codes from the matrix $M_{TX}$ to user B. The spreading matrix $M_{TX}$ may be common to both spreading matrix components 212 and 232 in the transmitters 210 and 230 of user terminals 101 and 102, respectively.

Figure 4:
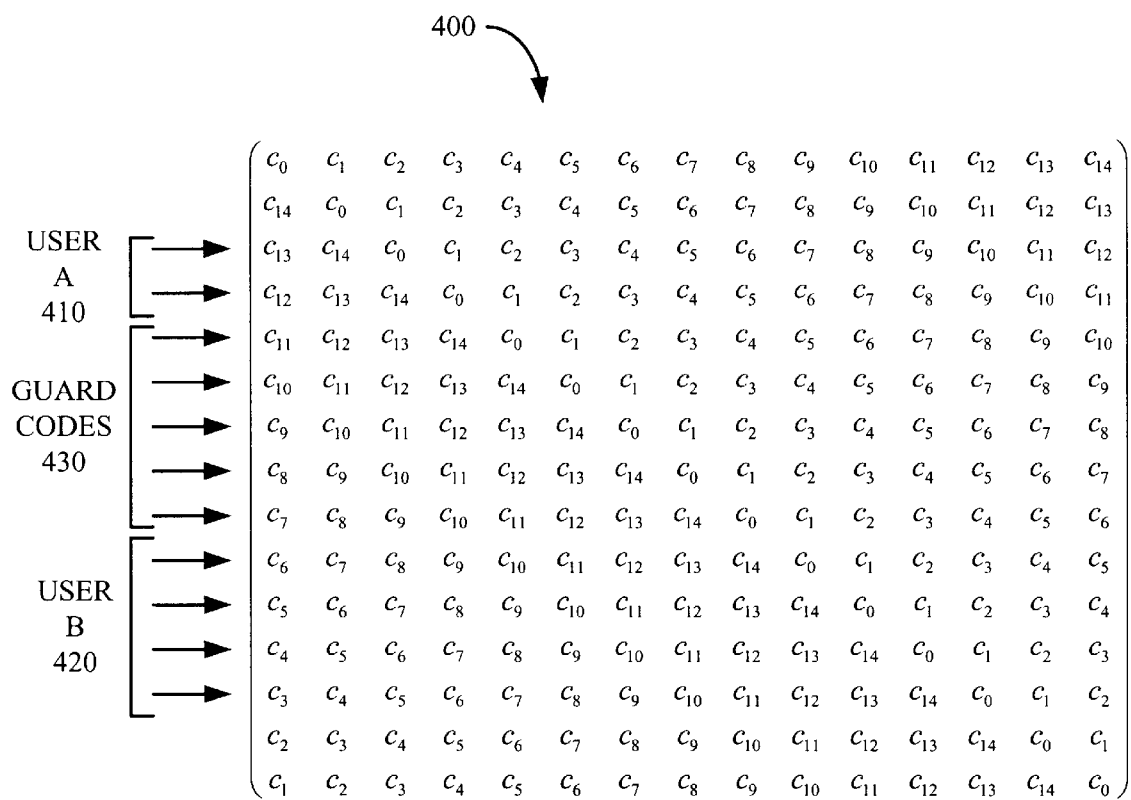
FIG. 4 illustrates an exemplary method for allocating codes of a spreading matrix.

FIG. 4 illustrates an exemplary allocation of codes from the spreading matrix $M_{TX}$ 400 to users A and B. As illustrated, the spreader 213 of user terminal 101 allocates codes $\{3, 4\}$ (or rows 3 and 4), denoted 410 in FIG. 4, of the spreading matrix $M_{TX}$ 400 to user A. Codes $\{3, 4\}$ correspond to the rows beginning with $c_{13}$ and $c_{12}$, respectively, in the matrix $M_{TX}$ 400. Similarly, the spreader 233 of optical user terminal 102 allocates the codes $\{10, 11, 12, 13\}$, denoted 420 in FIG. 4, of the matrix $M_{TX}$ 400 to user B. Codes $\{10, 11, 12, 13\}$ correspond to the rows beginning with $c_6$–$c_3$, respectively.

In order to guarantee that the signals from user A and user B will not interfere with one another, a number of codes located between those codes allocated to user A 410 and user B 420 in matrix $M_{TX}$ 400, referred to as "guard codes" 430, are left unassigned. The guard codes 430, illustrated in matrix $M_{TX}$ 400 as rows 5–9, aid in reducing the effects of a lack of synchronization between the individual transmitters 210 and 230, and receiver 250. Assuming a maximum time synchronization uncertainty between users A and B corresponds to $N_{uncertainty}$ symbol times, the number of guard codes should be chosen so as to exceed $2*N_{uncertainty}$.

To further reduce the effects of a lack of synchronization between the transmitters 210 and 230, and the receiver 250, the transmitters 210 and 230 circularly extend the spreading matrix $M_{TX}$ to the left and right. For example, the extensions to the left and to the right may be represented respectively as:

$$\begin{pmatrix} c_{12} & c_{13} & c_{14} \\ c_{11} & c_{12} & c_{13} \\ c_{10} & c_{11} & c_{12} \\ c_9 & c_{10} & c_{11} \\ c_8 & c_9 & c_{10} \\ c_7 & c_8 & c_9 \\ c_6 & c_7 & c_8 \\ c_5 & c_6 & c_7 \\ c_4 & c_5 & c_6 \\ c_3 & c_4 & c_5 \\ c_2 & c_3 & c_4 \\ c_1 & c_2 & c_3 \\ c_0 & c_1 & c_2 \\ c_{14} & c_0 & c_1 \\ c_{13} & c_{14} & c_0 \end{pmatrix}$$

and $$\begin{pmatrix} c_0 & c_1 & c_2 \\ c_{14} & c_0 & c_1 \\ c_{13} & c_{14} & c_0 \\ c_{12} & c_{13} & c_{14} \\ c_{11} & c_{12} & c_{13} \\ c_{10} & c_{11} & c_{12} \\ c_9 & c_{10} & c_{11} \\ c_8 & c_9 & c_{10} \\ c_7 & c_8 & c_9 \\ c_6 & c_7 & c_8 \\ c_5 & c_6 & c_7 \\ c_4 & c_5 & c_6 \\ c_3 & c_4 & c_5 \\ c_2 & c_3 & c_4 \\ c_1 & c_2 & c_3 \end{pmatrix}$$

The circularly extended spreading matrix $M_{TX}$ can then be written as:

$$\begin{pmatrix} c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 \\ c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 \\ c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 \\ c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} \\ c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} \\ c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} \\ c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} \\ c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} \\ c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 \\ c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 \\ c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 \\ c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 \\ c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 \\ c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 \\ c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 \end{pmatrix}$$

The spreader 213 and 233 of each optical user terminal spreads the data symbols of the respective user A or B with the allocated codes, 410 and 420, from spreading matrix $M_{TX}$ 400 [step 310]. To accomplish this, each transmitter 210 and 230 multiplies the individual symbols of users A or B by the respective codes 410 and 420 allocated to users A and B. For example, the spreader 213 of optical user terminal 101 multiplies user A's symbols $\{a_0, a_1\}$ by the third and fourth rows of the circularly-extended spreading matrix $M_{TX}$ 400, respectively. Similarly, the spreader 233 of optical user terminal 102 multiplies user B's symbols $\{b_0, b_1, b_2, b_3\}$ by the tenth through thirteenth rows, respectively, of the spreading matrix $M_{TX}$ 400. Such multiplication operations act to spread the data symbols. The result of the multiplication operations can be illustrated as follows:

$\{\{a_0c_{10}, a_0c_{11}, a_0c_{12}, a_0c_{13}, a_0c_{14}, a_0c_0, a_0c_1, a_0c_2, a_0c_3, a_0c_4, a_0c_5, a_0c_6, a_0c_7, a_0c_8, a_0c_9, a_0c_{10}, a_0c_{11}, a_0c_{12}, a_0c_{13}, a_0c_{14}, a_0c_0\}, \{a_1c_9, a_1c_{10}, a_1c_{11}, a_1c_{12}, a_1c_{13}, a_1c_{14}, a_1c_0, a_1c_1, a_1c_2, a_1c_3, a_1c_4, a_1c_5, a_1c_6, a_1c_7, a_1c_8, a_1c_9, a_1c_{10}, a_1c_{11}, a_1c_{12}, a_1c_{13}, a_1c_{14}\}\}$ and $\{\{b_0c_3, b_0c_4, b_0c_5, b_0c_6, b_0c_7, b_0c_8, b_0c_9, b_0c_{10}, b_0c_{11}, b_0c_{12}, b_0c_{13}, b_0c_{14}, b_0c_0, b_0c_1, b_0c_2, b_0c_3, b_0c_4, b_0c_5, b_0c_6, b_0c_7, b_0c_8\}, \{b_1c_2, b_1c_3, b_1c_4, b_1c_5, b_1c_6, b_1c_7, b_1c_8, b_1c_9, b_1c_{10}, b_1c_{11}, b_1c_{12}, b_1c_{13}, b_1c_{14}, b_1c_0, b_1c_1, b_1c_2, b_1c_3, b_1c_4, b_1c_5, b_1c_6, b_1c_7\}, \{b_2c_1, b_2c_2, b_2c_3, b_2c_4, b_2c_5, b_2c_6, b_2c_7, b_2c_8, b_2c_9, b_2c_{10}, b_2c_{11}, b_2c_{12}, b_2c_{13}, b_2c_{14}, b_2c_0, b_2c_1, b_2c_2, b_2c_3, b_2c_4, b_2c_5, b_2c_6\}, \{b_3c_0, b_3c_1, b_3c_2, b_3c_3, b_3c_4, b_3c_5, b_3c_6, b_3c_7, b_3c_8, b_3c_9, b_3c_{10}, b_3c_{11}, b_3c_{12}, b_3c_{13}, b_3c_{14}, b_3c_0, b_3c_1, b_3c_2, b_3c_3, b_3c_4, b_3c_5\}\}$ The spreader 213 and 233 of each optical user terminal then adds the spread information column by column to group the modulated symbols to be transmitted together at a particular time [step 312]. The addition operation results in the following groups of signals for users A and B, respectively:

$\{a_1c_9+a_0c_{10}, a_1c_{10}+a_0c_{11}, a_1c_{11}+a_0c_{12}, a_1c_{12}+a_0c_{13}, a_1c_{13}+a_0c_{14}, a_1c_{14}+a_0c_0, a_1c_0+a_0c_1, a_1c_1+a_0c_2, a_1c_2+a_0c_3, a_1c_3+a_0c_4, a_1c_4+a_0c_5, a_1c_5+a_0c_6, a_1c_6+a_0c_7, a_1c_7+a_0c_8, a_1c_8+a_0c_9, a_1c_9+a_0c_{10}, a_1c_{10}+a_0c_{11}, a_1c_{11}+a_0c_{12}, a_1c_{12}+a_0c_{13}, a_1c_{13}+a_0c_{14}, a_1c_{14}+a_0c_0\}$, and $\{b_3c_0+b_2c_1+b_1c_2+b_0c_3, b_3c_1+b_2c_2+b_1c_3+b_0c_4, b_3c_2+b_2c_3+b_1c_4+b_0c_5, b_3c_3+b_2c_4+b_1c_5+b_0c_6, b_3c_4+b_2c_5+b_1c_6+b_0c_7, b_3c_5+b_2c_6+b_1c_7+b_0c_8, b_3c_6+b_2c_7+b_1c_8+b_0c_9, b_3c_7+b_2c_8+b_1c_9+b_0c_{10}, b_3c_8+b_2c_9+b_1c_{10}+b_0c_{11}, b_3c_9+b_2c_{10}+b_1c_{11}+b_0c_{12}, b_3c_{10}+b_2c_{11}+b_1c_{12}+b_0c_{13}, b_3c_{11}+b_2c_{12}+b_1c_{13}+b_0c_{14}, b_3c_{12}+b_2c_{13}+b_1c_{14}+b_0c_0, b_3c_{13}+b_2c_{14}+b_1c_0+b_0c_1, b_3c_{14}+b_2c_0+b_1c_1+b_0c_2, b_3c_0+b_2c_1+b_1c_2+b_0c_3, b_3c_1+b_2c_2+b_1c_3+b_0c_4, b_3c_2+b_2c_3+b_1c_4+b_0c_5, b_3c_3+b_2c_4+b_1c_5+b_0c_6, b_3c_4+b_2c_5+b_1c_6+b_0c_7, b_3c_5+b_2c_6+b_1c_7+b_0c_8\}$.

During time period one, for example, the transmitters 210 and 230 may transmit signal $\{a_1c_9+a_0c_{10}\}$ for user A and transmit signal $\{b_3c_0+b_2c_1+b_1c_2+b_0c_3\}$ for user B, respectively. For simplification, the above-described group of signals for users A and B can be rewritten, respectively, as:

$\{X_{A_0}, X_{A_1}, X_{A_2}, X_{A_3}, X_{A_4}, X_{A_5}, X_{A_6}, X_{A_7}, X_{A_8}, X_{A_9}, X_{A_{10}}, X_{A_{11}}, X_{A_{12}}, X_{A_{13}}, X_{A_{14}}, X_{A_{15}}, X_{A_{16}}, X_{A_{17}}, X_{A_{18}}, X_{A_{19}}, X_{A_{20}}\}$, and $\{X_{B_0}, X_{B_1}, X_{B_2}, X_{B_3}, X_{B_4}, X_{B_5}, X_{B_6}, X_{B_7}, X_{B_8}, X_{B_9}, X_{B_{10}}, X_{B_{11}}, X_{B_{12}}, X_{B_{13}}, X_{B_{14}}, X_{B_{15}}, X_{B_{16}}, X_{B_{17}}, X_{B_{18}}, X_{B_{19}}, X_{B_{20}}\}$, where the values of $X_A$ and $X_B$ are given, respectively, by:

| | |
|---|---|
| XA0 — $a_1 c_9 + a_0 c_{10}$ | XA1 — $a_1 c_{10} + a_0 c_{11}$ |
| XA2 — $a_1 c_{11} + a_0 c_{12}$ | XA3 — $a_1 c_{12} + a_0 c_{13}$ |
| XA4 — $a_1 c_{13} + a_0 c_{14}$ | XA5 — $a_1 c_{14} + a_0 c_0$ |
| XA6 — $a_1 c_0 + a_0 c_1$ | XA7 — $a_1 c_1 + a_0 c_2$ |
| XA8 — $a_1 c_2 + a_0 c_3$ | XA9 — $a_1 c_3 + a_0 c_4$ |
| XA10 — $a_1 c_4 + a_0 c_5$ | XA11 — $a_1 c_5 + a_0 c_6$ |
| XA12 — $a_1 c_6 + a_0 c_7$ | XA13 — $a_1 c_7 + a_0 c_8$ |
| XA14 — $a_1 c_8 + a_0 c_9$ | XA15 — $a_1 c_9 + a_0 c_{10}$ |
| XA16 — $a_1 c_{10} + a_0 c_{11}$ | XA17 — $a_1 c_{11} + a_0 c_{12}$ |
| XA18 — $a_1 c_{12} + a_0 c_{13}$ | XA19 — $a_1 c_{13} + a_0 c_{14}$ |
| XA20 — $a_1 c_{14} + a_0 c_0$ | | and

XB0 — $b_3 c_0 + b_2 c_1 + b_1 c_2 + b_0 c_3$
XB1 — $b_3 c_1 + b_2 c_2 + b_1 c_3 + b_0 c_4$
XB2 — $b_3 c_2 + b_2 c_3 + b_1 c_4 + b_0 c_5$
XB3 — $b_3 c_3 + b_2 c_4 + b_1 c_5 + b_0 c_6$
XB4 — $b_3 c_4 + b_2 c_5 + b_1 c_6 + b_0 c_7$
XB5 — $b_3 c_5 + b_2 c_6 + b_1 c_7 + b_0 c_8$
XB6 — $b_3 c_6 + b_2 c_7 + b_1 c_8 + b_0 c_9$
XB7 — $b_3 c_7 + b_2 c_8 + b_1 c_9 + b_0 c_{10}$
XB8 — $b_3 c_8 + b_2 c_9 + b_1 c_{10} + b_0 c_{11}$
XB9 — $b_3 c_9 + b_2 c_{10} + b_1 c_{11} + b_0 c_{12}$
XB10 — $b_3 c_{10} + b_2 c_{11} + b_1 c_{12} + b_0 c_{13}$
XB11 — $b_3 c_{11} + b_2 c_{12} + b_1 c_{13} + b_0 c_{14}$
XB12 — $b_3 c_{12} + b_2 c_{13} + b_1 c_{14} + b_0 c_0$
XB13 — $b_3 c_{13} + b_2 c_{14} + b_1 c_0 + b_0 c_1$
XB14 — $b_3 c_{14} + b_2 c_0 + b_1 c_1 + b_0 c_2$,
XB15 — $b_3 c_0 + b_2 c_1 + b_1 c_2 + b_0 c_3$
XB16 — $b_3 c_1 + b_2 c_2 + b_1 c_3 + b_0 c_4$
XB17 — $b_3 c_2 + b_2 c_3 + b_1 c_4 + b_0 c_5$
XB18 — $b_3 c_3 + b_2 c_4 + b_1 c_5 + b_0 c_6$
XB19 — $b_3 c_4 + b_2 c_5 + b_1 c_6 + b_0 c_7$
XB20 — $b_3 c_5 + b_2 c_6 + b_1 c_7 + b_0 c_8$.

Since the sequence chips $c_0$–$c_{15}$ and the data modulated symbols $a_0$–$a_1$ and $b_0$–$b_3$ may be real numbers with non negative values, the composite chip values $X_{A_{0\text{-}20}}$ and $X_{B_{0\text{-}20}}$ may also be real-valued, non-negative numbers and, therefore, suitable for transmission using ON-OFF non-coherent power-based light modulation, performed at the electrical-optical transceivers 216 and 236.

After adding the data symbols [step 312], the spread symbols may be subjected to further conditioning prior to transmission [step 314]. The channel impulse response functions $h_A(t)$ and $h_B(t)$ take into consideration, among other things, the propagation delays between transmitters 210 and 230, respectively, and receiver 250. In the case of ON/OFF transmission and non-coherent reception, the wavelength channel may have a much greater bandwidth than the symbol rate. In such a case, the functions $h_A(t)$ and $h_B(t)$ may be modeled as $h_A(t)=h_B(t)=\delta(t)$, where $\delta(t)>0$ is the Dirac Delta function. In the case of coherent transmission-reception, the functions $h_A(t)$ and $h_B(t)$ may assume negative values resulting, as an example, from using wavelength channels with finite bandwidth.

After conditioning the data symbols [step 314], the electrical-optical transceivers 216 and 236 may modulate light emitted from the light source 215 and 235, respectively, according to a driving voltage generated by the driver circuit 214 and 234 to thereby convert the real-valued, non-negative spread signals to ON/OFF optical signals [step 316]. The transmitters 210 and 230 may also, prior to transmitting, process the signals in a well-known manner using a waveform division multiplexer. The transmitters 210 and 230 may then transmit the optical signals over the optical transmission medium 150 [step 318].

Figure 3B:
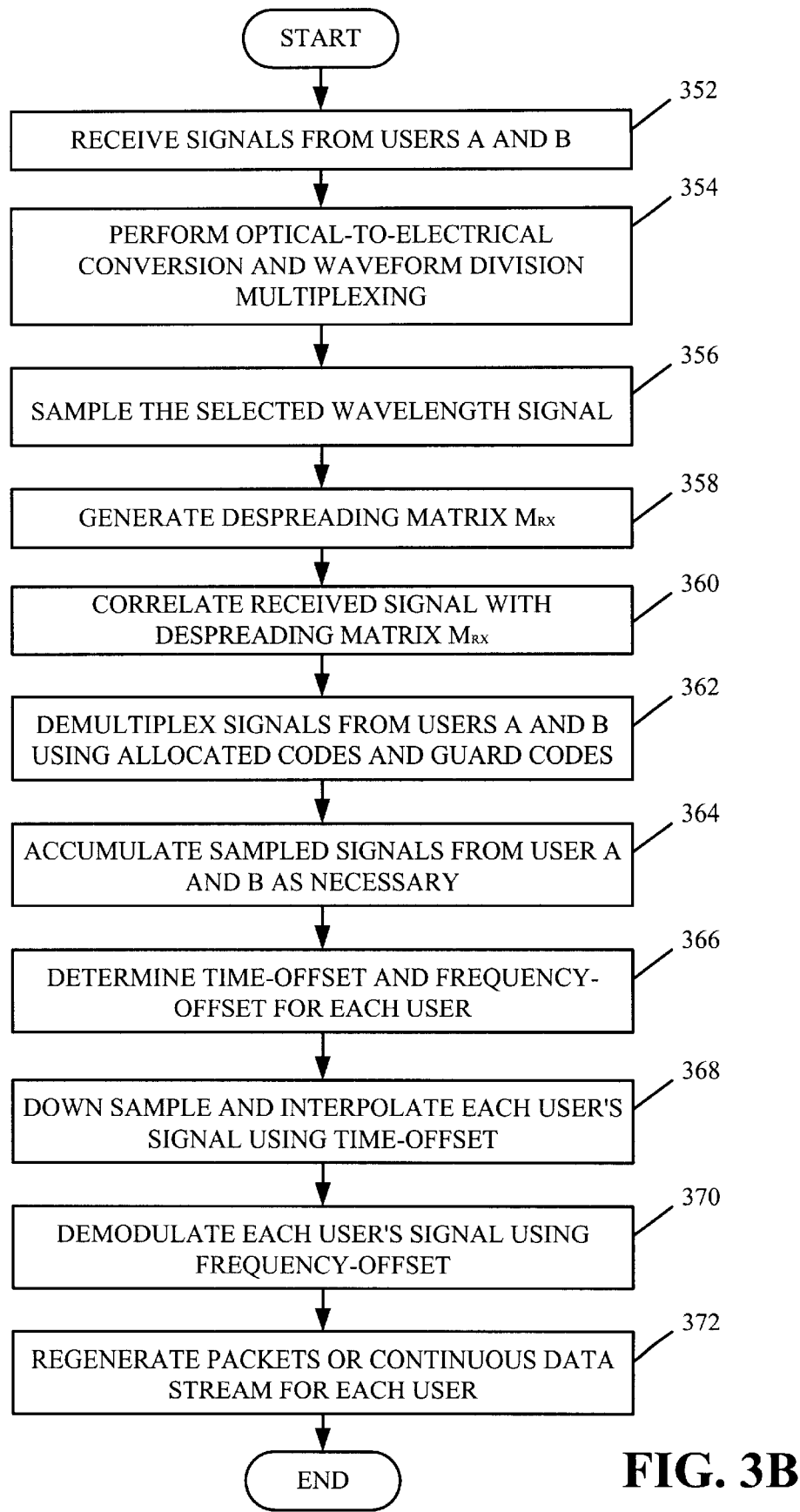
FIG. 3B illustrates an exemplary process, consistent with the present invention, for processing signals received at an optical receiver.

FIG. 3B illustrates an exemplary process, consistent with the present invention, for processing signals received at an optical receiver, such as common receiver 250. The common receiver 250 receives the signals transmitted by the optical user terminals 101 and 102 containing spread data symbols for user A and user B, respectively [step 352]. The optical-to-electrical transceiver 251 generates a baseband electrical version of the received optical signal at the wavelength channel λ10 via conventional optical-to-electrical conversion and wavelength division multiplexing operations [step 354]. The resulting electric signal at the common receiver 250 can be expressed as $$z(t) = \sum_k X_{A_k} h_A(t-kt-\epsilon_A T) + X_{B_k} h_B(t-kt-\epsilon_B T) + w(t)$$

where $h_A(t)$ and $h_B(t)$ are the channel impulse responses for the user terminals 101 and 102, respectively, w(t) is the added channel noise, and $\epsilon_A$ and $\epsilon_B$ are the fractional delay offsets for the transmission for user A and user B, respectively.

The receiver 250 may sample the signal z(t) at a rate of $$\frac{1}{T_s},$$

where $$\frac{T}{T_s}$$

is the over-sample factor [step 356]. The samples of the discrete time signal available at the receiver 250 at time $$t = n\frac{T}{T_s}$$

can be represented as:

$$z(n) = z\left(t = n\frac{T}{T_s}\right) = \sum_k X_{A_k} h_A\left((n-k)\frac{T}{T_s} - \epsilon_A T\right) +$$

$$X_{B_k} h_B\left((-k)\frac{T}{T_s} - \epsilon_B T\right) + w(n)$$

$$= \sum_k X_{A_k} H_{A_{n-k}} + X_{B_k} H_{B_{n-k}} + w(n)$$

where $H_{A}=\{h_{A_0}, h_{A_1}, h_{A_2}, h_{A_3}, h_{A_4}, h_{A_5}, h_{A_6}, h_{A_7}, h_{A_8}, h_{A_9}, h_{A_{10}}, h_{A_{11}}, h_{A_{12}}, h_{A_{13}}, h_{A_{14}}\}$ and $H_{B}=\{h_{B_0}, h_{B_1}, h_{B_2}, h_{B_3}, h_{B_4}, h_{B_5}, h_{B_6}, h_{B_7}, h_{B_8}, h_{B_9}, h_{B_{10}}, h_{B_{11}}, h_{B_{12}}, h_{B_{13}}, h_{B_{14}}\}$ and where $h_{Aj}=h_A((n-j)T/Ts-\epsilon_A T), j=0, 1, 2,$ $h_{Bj}=h_B((n-j)T/Ts-\epsilon_B T), j=0, 1, 2,$ are the finite-length sampled versions of the channel impulse responses for users A and B, respectively. In the case of ON/OFF transmission, for wavelength channels having very high bandwidth, as compared to the baseband symbol rate, the vectors $H_A$ and $H_B$ may be represented by a discrete rectangular window, where the length of the window corresponds to the width of the transmission pulse in samples.

The noise free signals received from user A and user B, given by:

$$Y_A = \Sigma_k X_{A_k} H_{A_{n-k}}$$

$$Y_B = \Sigma_k X_{B_k} H_{B_{n-k}},$$

can be calculated by convolving $\{X_{A_0}, X_{A_0}, X_{A_0}, X_{A_0}, X_{A_1}, X_{A_1}, X_{A_1}, X_{A_1}, X_{A_2}, X_{A_2}, X_{A_2}, X_{A_2}, X_{A_3}, X_{A_3}, X_{A_3}, X_{A_3}, X_{A_4}, X_{A_4}, X_{A_4}, X_{A_4}, X_{A_5}, X_{A_5}, X_{A_5}, X_{A_5}, X_{A_6}, X_{A_6}, X_{A_6}, X_{A_6}, X_{A_7}, X_{A_7}, X_{A_7}, X_{A_7}, X_{A_8}, X_{A_8}, X_{A_8}, X_{A_8}, X_{A_9}, X_{A_9}, X_{A_9}, X_{A_9}, X_{A_{10}}, X_{A_{10}}, X_{A_{10}}, X_{A_{10}}, X_{A_{11}}, X_{A_{11}}, X_{A_{11}}, X_{A_{11}}, X_{A_{12}}, X_{A_{12}}, X_{A_{12}}, X_{A_{12}}, X_{A_{13}}, X_{A_{13}}, X_{A_{13}}, X_{A_{13}}, X_{A_{14}}, X_{A_{14}}, X_{A_{14}}, X_{A_{14}}, X_{A_{15}}, X_{A_{15}}, X_{A_{15}}, X_{A_{15}}, X_{A_{16}}, X_{A_{16}}, X_{A_{16}}, X_{A_{16}}, X_{A_{17}}, X_{A_{17}}, X_{A_{17}}, X_{A_{17}}, X_{A_{18}}, X_{A_{18}}, X_{A_{18}}, X_{A_{18}}, X_{A_{19}}, X_{A_{19}}, X_{A_{19}}, X_{A_{19}}, X_{A_{20}}, X_{A_{20}}, X_{A_{20}}, X_{A_{20}}\}$ and $\{X_{B_0}, X_{B_0}, X_{B_0}, X_{B_0}, X_{B_1}, X_{B_1}, X_{B_1}, X_{B_1}, X_{B_2}, X_{B_2}, X_{B_2}, X_{B_2}, X_{B_3}, X_{B_3}, X_{B_3}, X_{B_3}, X_{B_4}, X_{B_4}, X_{B_4}, X_{B_4}, X_{B_5}, X_{B_5}, X_{B_5}, X_{B_5}, X_{B_6}, X_{B_6}, X_{B_6}, X_{B_6}, X_{B_7}, X_{B_7}, X_{B_7}, X_{B_7}, X_{B_8}, X_{B_8}, X_{B_8}, X_{B_8}, X_{B_9}, X_{B_9}, X_{B_9}, X_{B_9}, X_{B_{10}}, X_{B_{10}}, X_{B_{10}}, X_{B_{10}}, X_{B_{11}}, X_{B_{11}}, X_{B_{11}}, X_{B_{11}}, X_{B_{12}}, X_{B_{12}}, X_{B_{12}}, X_{B_{12}}, X_{B_{13}}, X_{B_{13}}, X_{B_{13}}, X_{B_{13}}, X_{B_{14}}, X_{B_{14}}, X_{B_{14}}, X_{B_{14}}, X_{B_{15}}, X_{B_{15}}, X_{B_{15}}, X_{B_{15}}, X_{B_{16}}, X_{B_{16}}, X_{B_{16}}, X_{B_{16}}, X_{B_{17}}, X_{B_{17}}, X_{B_{17}}, X_{B_{17}}, X_{B_{18}}, X_{B_{18}}, X_{B_{18}}, X_{B_{18}}, X_{B_{19}}, X_{B_{19}}, X_{B_{19}}, X_{B_{19}}, X_{B_{20}}, X_{B_{20}}, X_{B_{20}}, X_{B_{20}}\}$ with the sampled version of the channel impulse responses $H_A$ and $H_B$ to form the signals $Y_A$ and $Y_B$, respectively.

The signals from user A and user B are combined at the common receiver 250 to form the signal $$Z=Y_A+Y_B.$$

The following illustrates the beginning and ending portions of the discrete time signal received from user A where each line corresponds to a sample time:

$h_{A_0}x_{A_0}$ $h_{A_0}x_{A_0}+h_{A_1}x_{A_0}$ $h_{A_0}x_{A_0}+h_{A_1}x_{A_0}+h_{A_2}x_{A_0}$ $h_{A_0}x_{A_0}+h_{A_1}x_{A_0}+h_{A_2}x_{A_0}+h_{A_3}x_{A_0}$ $h_{A_1}x_{A_0}+h_{A_2}x_{A_0}+h_{A_3}x_{A_0}+h_{A_4}x_{A_0}+h_{A_0}x_{A_1}$ $h\,A_2x_{A_0}+h_{A_3}x_{A_0}+h_{A_4}x_{A_0}+h_{A_5}x_{A_0}+h_{A_0}x_{A_1}+h_{A_1}x_{A_1}$ $h_{A_3}x_{A_0}+h_{A_4}x_{A_0}+h_{A_5}x_{A_0}+h_{A_6}x_{A_0}+h_{A_0}x_{A_1}+h_{A_1}x_{A_1}+h_{A_2}x_{A_1}$,

...

$h_{A_{12}}x_{A_{19}}+h_{A_{13}}x_{A_{19}}+h_{A_{14}}x_{A_{19}}+h_{A_8}x_{A_{20}}+h_{A_9}x_{A_{20}}+h_{A_{10}}x_{A_{20}}$ $h_{A_{13}}x_{A_{19}}+h_{A_{14}}x_{A_{19}}+h_{A_9}x_{A_{20}}+h_{A_{10}}x_{A_{20}}+h_{A_{11}}x_{A_{20}}+h_{A_{12}}x_{A_{20}}$ $h_{A_{14}}x_{A_{19}}+h_{A_{10}}x_{A_{20}}+h_{A_{11}}x_{A_{20}}+h_{A_{12}}x_{A_{20}}+h_{A_{13}}x_{A_{20}}$ $h_{A_{11}}x_{A_{20}}+h_{A_{12}}x_{A_{20}}+h_{A_{13}}x_{A_{20}}+h_{A_{14}}x_{A_{20}}$ $h_{A_{12}}x_{A_{20}}+h_{A_{13}}x_{A_{20}}+h_{A_{14}}x_{A_{20}}$ $h_{A_{13}}x\,A_{20}+h_{A_{14}}x_{A_{20}}$ $h_{A_{14}}x_{A_{20}}$

Similarly, the following illustrates the beginning and ending portions of the discrete time signal received from user B:

$h_{B_0}x_{B_0}$ $h_{B_0}x_{B_0}+h_{B_1}x_{B_0}$ $h_{B_0}x_{B_0}+h_{B_1}x_{B_0}+h_{B_2}x_{B_0}$ $h_{B_0}x_{B_0}+h_{B_1}x_{B_0}+h_{B_2}x_{B_0}+h_{B_3}x_{B_0}$ $h_{B_1}x_{B_0}+h_{B_2}x_{B_0}+h_{B_3}x_{B_0}+h_{B_4}x_{B_0}+h_{B_0}x_{B_1}$ $h_{B_2}x_{B_0}+h_{B_3}x_{B_0}+h_{B_4}x_{B_0}+h_{B_5}x_{B_0}+h_{B_0}x_{B_1}+h_{B_1}x_{B_1}$ $h_{B_3}x_{B_0}+h_{B_4}x_{B_0}+h_{B_5}x_{B_0}+h_{B_6}x_{B_0}+h_{B_0}x_{B_1}+h_{B_1}x_{B_1}+h_{B_2}x_{B_1}$

...

$h_{B_{12}}x_{B_{19}}+h_{B_{13}}x_{B_{19}}+h_{B_{14}}x_{B_{19}}+h_{B_8}x_{B_{20}}+h_{B_9}x_{B_{20}}+h_{B_{10}}x_{B_{20}}+h_{B_{11}}x_{B_{20}}$ $h_{B_{13}}x_{B_{19}}+h_{B_{14}}x_{B_{19}}+h_{B_9}x_{B_{20}}+h_{B_{10}}x_{B_{20}}+h_{B_{11}}x_{B_{20}}+h_{B_{12}}$ $h_{B_{14}}x_{B_{19}}+h_{B_{10}}x_{B_{20}}+h_{B_{11}}x_{B_{20}}+h_{B_{12}}x_{B_{20}}+h_{B_{13}}x_{B_{20}}$ $h_{B_{11}}x_{B_{20}}+h_{B_{12}}x_{B_{20}}+h_{B_{13}}x_{B_{20}}+h_{B_{14}}x_{B_{20}}$ $h_{B_{12}}x_{B_{20}}+h_{B_{13}}x_{B_{20}}+h_{B_{14}}x_{B_{20}}$ $h_{B_{13}}x_{B_{20}}+h_{B_{14}}x_{B_{20}}$ $h_{B_{14}}x_{B_{20}}$

The following illustrates the beginning and ending portions of the "aggregate" discrete time signal received from users A and B:

$h_{A_0}x_{A_0}+h_{B_0}x_{B_0}$ $h_{A_0}x_{A_0}+h_{A_1}x_{A_0}+h_{B_0}x_{B_0}+h_{B_1}x_{B_0}$ $h_{A_0}x_{A_0}+h_{A_1}x_{A_0}+h_{A_2}x_{A_0}+h_{B_0}x_{B_0}+h_{B_1}x_{B_0}+h_{B_2}x_{B_0}$

...

$h_{A_{12}}x_{A_{20}}+h_{A_{13}}x_{A_{20}}+h_{A_{14}}x_{A_{20}}+h_{B_{12}}x_{B_{20}}+h_{B_{13}}x_{B_{20}}+h_{B_{14}}x_{B_{20}}+h_{A_{13}}x_{A_{20}}+h_{A_{14}}x_{A_{20}}+h_{B_{13}}x_{B_{20}}+h_{B_{14}}x_{B_{20}}+h_{A_{14}}x_{A_{20}}+h_{B_{14}}x_{B_{20}}$

An expanded form of the above signals can be obtained by re-inserting the values for $X_A$ and $X_B$. The initial samples of the signal received from user A can, therefore, be represented as:

$(a_1c_9+a_0c_{10})h_{A_0}$ $(a_1c_9+a_0c_{10})h_{A_0}+(a_1c_9+a_0c_{10})h_{A_1}$ $(a_1c_9+a_0c_{10})h_{A_0}+(a_1c_9+a_0c_{10})h_{A_1}+(a_1c_9+a_0c_{10})h_{A_2}$

Similarly, the initial samples of the signal received from user B can be represented in expanded form as:

$(b_3c_0+b_2c_1+b_1c_2+b_0c_3)h_{B_0}$ $(b_3c_0+b_2c_1+b_1c_2+b_0c_3)h_{B_0}+(b_3c_0+b_2c_1+b_1c_2+b_0c_3)h_{B_1}$ $(b_3c_0+b_2c_1+b_1c_2+b_0c_3)h_{B_0}+(b_3c_0+b_2c_1+b_1c_2+b_0c_3)h_{B_1}+(b_3c_0+b_2c_1+b_1c_2+b_0c_3)h_{B_2}$.

An expanded form of the initial samples of the "aggregate" discrete time signal received from users A and B can be represented as:

$(a_1c_9+a_0c_{10})h_{A_0}+(b_3c_0+b_2c_1+b_1c_2+b_0c_3)h_{B_0}$ $(a_1c_9+a_0c_{10})h_{A_0}+(a_1c_9+a_0c_{10})h_{A_1}+(b_3c_0+b_2c_1+b_1c_2+b_0c_3)h_{B_0}+(b_3c_0+b_2c_1+b_1c_2+b_0c_3)h_{B_1}$.

To illustrate how the despreading matrix is generated in accordance with the utilization of an ON/OFF non-coherent transmission, assume that the base spreading code sequence C is represented as:

$\{1, 1, 1, 1, 0, 1, 0, 1, 1, 0, 0, 1, 0, 0, 0\}$ and that the corresponding spreading matrix $M_{TX}$ used by the transmitters 210 and 230 is represented by:

$$M_{TX} = \begin{pmatrix} 1 & 1 & 1 & 1 & 0 & 1 & 0 & 1 & 1 & 0 & 0 & 1 & 0 & 0 & 0 \\ 0 & 1 & 1 & 1 & 1 & 0 & 1 & 0 & 1 & 1 & 0 & 0 & 1 & 0 & 0 \\ 0 & 0 & 1 & 1 & 1 & 1 & 0 & 1 & 0 & 1 & 1 & 0 & 0 & 1 & 0 \\ 0 & 0 & 0 & 1 & 1 & 1 & 1 & 0 & 1 & 0 & 1 & 1 & 0 & 0 & 1 \\ 1 & 0 & 0 & 0 & 1 & 1 & 1 & 1 & 0 & 1 & 0 & 1 & 1 & 0 & 0 \\ 0 & 1 & 0 & 0 & 0 & 1 & 1 & 1 & 1 & 0 & 1 & 0 & 1 & 1 & 0 \\ 0 & 0 & 1 & 0 & 0 & 0 & 1 & 1 & 1 & 1 & 0 & 1 & 0 & 1 & 1 \\ 1 & 0 & 0 & 1 & 0 & 0 & 0 & 1 & 1 & 1 & 1 & 0 & 1 & 0 & 1 \\ 1 & 1 & 0 & 0 & 1 & 0 & 0 & 0 & 1 & 1 & 1 & 1 & 0 & 1 & 0 \\ 0 & 1 & 1 & 0 & 0 & 1 & 0 & 0 & 0 & 1 & 1 & 1 & 1 & 0 & 1 \\ 1 & 0 & 1 & 1 & 0 & 0 & 1 & 0 & 0 & 0 & 1 & 1 & 1 & 1 & 0 \\ 0 & 1 & 0 & 1 & 1 & 0 & 0 & 1 & 0 & 0 & 0 & 1 & 1 & 1 & 1 \\ 1 & 0 & 1 & 0 & 1 & 1 & 0 & 0 & 1 & 0 & 0 & 0 & 1 & 1 & 1 \\ 1 & 1 & 0 & 1 & 0 & 1 & 1 & 0 & 0 & 1 & 0 & 0 & 0 & 1 & 1 \\ 1 & 1 & 1 & 0 & 1 & 0 & 1 & 1 & 0 & 0 & 1 & 0 & 0 & 0 & 1 \end{pmatrix}$$

As illustrated, the spreading matrix $M_{TX}$ contains only 1's and 0's. As such, the spreading matrix $M_{TX}$ lends itself well to ON/OFF modulation, where the 1's represent instances when the electrical-optical transceivers 216 and 236 are ON and the 0's represent instances when the electrical-optical transceivers 216 and 236 are OFF.

When the spreading matrix $M_{TX}$ is constructed in this way, the spreaders 213 and 233 spread the data signals to be transmitted by performing a select-and-add operation. The spreaders 213 and 233 select the modulated symbols in those positions where the allocated spreading code contains a 1 and then add the selected modulated symbols.

Upon receipt of the signals from transmitters 210 and 230, the receiver 250, using the spreading matrix $M_{TX}$, generates, via a despreading code sequence generator 253, a despreading matrix $M_{RX}$ to despread signals received via the fiber optic medium 150 [step 358]. In an implementation consistent with the present invention, the receiver 250 generates a despreading matrix $M_{RX}$ that is different than and orthogonal to the spreading matrix $M_{TX}$ used to spread the data signals in the transmitters 210 and 230. The use of such a despreading matrix $M_{RX}$ reduces interference caused by one's own signal and allows for the use of a despreading matrix that is best suited for that particular receiver.

The despreading matrix generator 253 may generate the despreading matrix $M_{RX}$ as the inverse of the spreading matrix $M_{TX}$. The despreading matrix $M_{RX}$, corresponding to the spreading $M_{TX}$ composed of 1's and 0's above, can be represented as:

$$M_{RX} = \begin{pmatrix} 1 & -1 & -1 & -1 & 1 & -1 & -1 & 1 & 1 & -1 & 1 & -1 & 1 & 1 & 1 \\ 1 & 1 & -1 & -1 & -1 & 1 & -1 & -1 & 1 & 1 & -1 & 1 & -1 & 1 & 1 \\ 1 & 1 & 1 & -1 & -1 & -1 & 1 & -1 & -1 & 1 & 1 & -1 & 1 & -1 & 1 \\ 1 & 1 & 1 & 1 & -1 & -1 & -1 & 1 & -1 & -1 & 1 & 1 & -1 & 1 & -1 \\ -1 & 1 & 1 & 1 & 1 & -1 & -1 & -1 & 1 & -1 & -1 & 1 & 1 & -1 & 1 \\ 1 & -1 & 1 & 1 & 1 & 1 & -1 & -1 & -1 & 1 & -1 & -1 & 1 & 1 & -1 \\ -1 & 1 & -1 & 1 & 1 & 1 & 1 & -1 & -1 & -1 & 1 & -1 & -1 & 1 & 1 \\ 1 & -1 & 1 & -1 & 1 & 1 & 1 & 1 & -1 & -1 & -1 & 1 & -1 & -1 & 1 \\ 1 & 1 & -1 & 1 & -1 & 1 & 1 & 1 & 1 & -1 & -1 & -1 & 1 & -1 & -1 \\ -1 & 1 & 1 & -1 & 1 & -1 & 1 & 1 & 1 & 1 & -1 & -1 & -1 & 1 & -1 \\ -1 & -1 & 1 & 1 & -1 & 1 & -1 & 1 & 1 & 1 & 1 & -1 & -1 & -1 & 1 \\ 1 & -1 & -1 & 1 & 1 & -1 & 1 & -1 & 1 & 1 & 1 & 1 & -1 & -1 & -1 \\ -1 & 1 & -1 & -1 & 1 & 1 & -1 & 1 & -1 & 1 & 1 & 1 & 1 & -1 & -1 \\ -1 & -1 & 1 & -1 & -1 & 1 & 1 & -1 & 1 & -1 & 1 & 1 & 1 & 1 & -1 \\ -1 & -1 & -1 & 1 & -1 & -1 & 1 & 1 & -1 & 1 & -1 & 1 & 1 & 1 & 1 \end{pmatrix}$$

It is apparent from the above matrices that the despreading matrix $M_{RX}$ and the spreading matrix $M_{TX}$ are different. While it was convenient in the transmitters 210 and 230 to provide a spreading matrix $M_{TX}$ having only 1's and 0's, the despreading matrix $M_{RX}$ need not be so constructed. Implementations consistent with the present invention allow for asymmetric orthogonal codes to be used in optical communications. By allowing the transmitters 210 and 230 and the receiver 250 to use spreading and despreading matrices that are the inverse or proportional to the inverse of each other, the interference caused by one's own transmission can be reduced or even eliminated.

In those instances where the spreading code matrix $M_{TX}$ is not invertible (i.e., when it is rectangular or square with a determinant equal zero), the despreading code matrix $M_{RX}$ may be generated as the pseudo-inverse, or proportional to the pseudo-inverse, of the spreading matrix $M_{TX}$. By allowing the transmitters 210 and 230, and the receiver 250 to use spreading and despreading matrices that are the pseudo-inverse or proportional to the pseudo-inverse of each other, the interference caused by one's own transmission can be reduced or even eliminated.

Once the despreading matrix $M_{RX}$ is generated, the correlator 254 despreads the received signal Z using the despreading matrix $M_{RX}$ [step 360]. The despreading process may involve, for example, multiplying the signal by the first column of the matrix, then by the second column of the matrix, etc.

The correlator 254 may remove the cyclic padding in the received signal that was added at the transmitter side to enable correct signal reception in the presence of time uncertainties. As assumed above, the values of the base spreading code sequence C at the transmitter side correspond as follows:

$\{c_0 \rightarrow 1, c_1 \rightarrow 1, c_2 \rightarrow 1, c_3 \rightarrow 1, c_4 \rightarrow 0, c_5 \rightarrow 1, c_6 \rightarrow 0, c_7 \rightarrow 1,$
$c_8 \rightarrow 1, c_9 \rightarrow 0, c_{10} \rightarrow 0, c_{11} \rightarrow 1, c_{12} \rightarrow 0, c_{13} \rightarrow 0, c_{14} \rightarrow 0\}$.

Substituting these values of the spreading code sequence C into the received signal Z, the components of the first signal can be rewritten, for example, as:

$(a_1)h_{A_8} + (a_1)h_{A_9} + (a_1)h_{A_{10}} + (a_1)h_{A_{11}} + (a_0)h_{A_{12}} + (a_0)h_{A_{13}} + (a_0)$
$h_{A_{14}} + (b_0 + b_2) \, h_{B_0} + (b_0 + b_2)h_{B_1} + (b_0 + b_2)h_{B_2} + (b_0 + b_2)h_{B_3} +$
$(b_1 + b_3)h_{B_4} + (b_1 + b_3)h_{B_5} + (b_1 + b_3)h_{B_6} + (b_1 + b_3)h_{B_7} + (b_0 +$
$b_2 + b_3)h_{B_8} + (b_0 + b_2 + b_3)h_{B_9} + (b_1 + b_2 + b_3)h_{B_{10}} + (b_0 + b_2 + b_3)$
$h_{B_{11}} + (b_1 + b_2 + b_3)h_{B_{12}} + (b_1 + b_2 + b_3)h_{B_{13}} + (b_1 + b_2 + b_3)h_{B_{14}}$.

As expected, this sample includes components of the data sequence transmitted by transmitter A 210 filtered by (i.e., convolved with) the impulse response $h_A$ of the channel between transmitter A 210 and the receiver 250 and components of the data sequence transmitted by transmitter B 230 filtered by the impulse response $h_B$ of the channel between transmitter B 230 and the receiver 250.

When the received signal Z is despread using the despreading matrix $M_{RX}$, the following result is obtained for time instances $T_0 - T_{59}$, respectively:

$0$
$a_0 h_{A_0}$
$a_0(h_{A_0} + h_{A_1})$
$a_0(h_{A_0} + h_{A_1} + h_{A_2})$
$a_0(h_{A_0} + h_{A_1} + h_{A_2} + h_{A_3})$
$a_1 h_{A_0} + a_0(h_{A_1} + h_{A_2} + h_{A_3} + h_{A_4})$
$a_1(h_{A_0} + h_{A_1}) + a_0(h_{A_2} + h_{A_3} + h_{A_4} + h_{A_5})$
$a_1(h_{A_0} + h_{A_1} + h_{A_2}) + a_0(h_{A_3} + h_{A_4} + h_{A_5} + h_{A_6})$
$a_1(h_{A_0} + h_{A_1} + h_{A_2} + h_{A_3}) + a_0(h_{A_4} + h_{A_5} + h_{A_6} + h_{A_7})$
$a_1(h_{A_1} + h_{A_2} + h_{A_3} + h_{A_4}) + a_0(h_{A_5} + h_{A_6} + h_{A_7} + h_{A_8})$
$a_1(h_{A_2} + h_{A_3} + h_{A_4} + h_{A_5}) + a_0(h_{A_6} + h_{A_7} + h_{A_8} + h_{A_9})$
$a_1(h_{A_3} + h_{A_4} + h_{A_5} + h_{A_6}) + a_0(h_{A_7} + h_{A_8} + h_{A_9} + h_{A_{10}})$
$a_1(h_{A_4} + h_{A_5} + h_{A_6} + h_{A_7}) + a_0(h_{A_8} + h_{A_9} + h_{A_{10}} + h_{A_{11}})$
$a_1(h_{A_5} + h_{A_6} + h_{A_7} + h_{A_8}) + a_0(h_{A_9} + h_{A_{10}} + h_{A_{11}} + h_{A_{12}})$
$a_1(h_{A_6} + h_{A_7} + h_{A_8} + h_{A_9}) + a_0(h_{A_{10}} + h_{A_{11}} + h_{A_{12}} + h_{A_{13}})$
$a_1(h_{A_7} + h_{A_8} + h_{A_9} + h_{A_{10}}) + a_0(h_{A_{11}} + h_{A_{12}} + h_{A_{13}} + h_{A_{14}})$
$a_1(h_{A_8} + h_{A_9} + h_{A_{10}} + h_{A_{11}}) + a_0(h_{A_{12}} + h_{A_{13}} + h_{A_{14}})$
$a_1(h_{A_9} + h_{A_{10}} + h_{A_{11}} + h_{A_{12}}) + a_0(h_{A_{13}} + h_{A_{14}})$
$a_1(h_{A_{10}} + h_{A_{11}} + h_{A_{12}} + h_{A_{13}}) + a_0 h_{A_{14}}$
$a_1(h_{A_{11}} + h_{A_{12}} + h_{A_{13}} + h_{A_{14}})$
$a_1(h_{A_{12}} + h_{A_{13}} + h_{A_{14}})$
$a_1(h_{A_{13}} + h_{A_{14}})$
$a_1 h_{A_{14}}$
$0$
$0$
$0$
$0$
$0$
$0$
$0$
$b_0 h_{B_0}$
$b_0(h_{B_0} + h_{B_1})$
$b_0(h_{B_0} + h_{B_1} + h_{B_2})$
$b_0(h_{B_0} + h_{B_1} + h_{B_2} + h_{B_3})$
$b_1 h_{B_0} + b_0(h_{B_1} + h_{B_2} + h_{B_3} + h_{B_4})$ $b_1(h_{B_0}+h_{B_1})+b_0(h_{B_2}+h_{B_3}+h_{B_4}+h_{B_5})$ $b_1(h_{B_0}+h_{B_1}+h_{B_2})+b_0(h_{B_3}+h_{B_4}+h_{B_5}+h_{B_6})$ $b_1(h_{B_0}+h_{B_1}+h_{B_2}+h_{B_3})+b_0(h_{B_4}+h_{B_5}+h_{B_6}+h_{B_7})$ $b_2h_{B_0}+b_1(h_{B_1}+h_{B_2}+h_{B_3}+h_{B_4})+b_0(h_{B_5}+h_{B_6}+h_{B_7}+h_{B_8})$ $b_2(h_{B_0}+h_{B_1})+b_1(h_{B_2}+h_{B_3}+h_{B_4}+h_{B_5})+b_0(h_{B_6}+h_{B_7}+h_{B_8}+h_{B_9})$ $b_2(h_{B_0}+h_{B_1}+h_{B_2})+b_1(h_{B_3}+h_{B_4}+h_{B_5}+h_{B_6})+b_0(h_{B_7}+h_{B_8}+h_{B_9}+h_{B_{10}})$ $b_2(h_{B_0}+h_{B_1}+h_{B_2}+h_{B_3})+b_1(h_{B_4}+h_{B_5}+h_{B_6}+h_{B_7})+b_0(h_{B_8}+h_{B_9}+h_{B_{10}}+h_{B_{11}})$ $b_3h_{B_0}+b_2(h_{B_1}+h_{B_2}+h_{B_3}+h_{B_4})+b_1(h_{B_5}+h_{B_6}+h_{B_7}+h_{B_{8)+b}0})h_{B_9}+h_{B_{10}}+h_{B_{11}}+h_{B_{12}})$ $b_3(h_{B_0}+h_{B_1})+b_2(h_{B_2}+h_{B_3}+h_{B_4}+h_{B_5})+b_1(h_{B_6}+h_{B_7}+h_{B_8}+h_{B_9})+b_0(h_{B_{10}}+h_{B_{11}}+h_{B_{12}}+h_{B_{13}})$ $b_3(h_{B_0}+h_{B_1}+h_{B_2})+b_2(h_{B_3}+h_{B_4}+h_{B_5}+h_{B_6})+b_1(h_{B_7}+h_{B_8}+h_{B_9}+h_{B_{10}})+b_0(h_{B_{11}}+h_{B_{12}}+h_{B_{13}}+h_{B_{14}})$ $b_3(h_{B_0}+h_{B_1}+h_{B_2}+h_{B_3})+b_2(h_{B_4}+h_{B_5}+h_{B_6}+h_{B_7})+b_1(h_{B_8}+h_{B_9}h_{B_{10}}+h_{B_{11}})+b_0(h_{B_{12}}+h_{B_{13}}+h_{B_{14}})$ $b_3(h_{B_1}+h_{B_2}+h_{B_3}+h_{B_4})+b_2(h_{B_5}+h_{B_6}+h_{B_7}+h_{B_8})+b_1(h_{B_9}+h_{B_{10}}+h_{B_{11}}+h_{B_{12}})+b_0(h_{B_{13}}+h_{B_{14}})$ $b_3(h_{B_2}+h_{B_3}+h_{B_4}+h_{B_5})+b_2(h_{B_6}+h_{B_7}+h_{B_8}+h_{B_9})+b_1(h_{B_{10}}+h_{B_{11}}+h_{B_{12}}+h_{B_{13}})+b_0h_{B_{14}}$ $b_3(h_{B_3}+h_{B_4}+h_{B_5}+h_{B_6})+b_2(h_{B_7}+h_{B_8}+h_{B_9}+h_{B_{10}})+b_1(h_{B_{11}}+h_{B_{12}}+h_{B_{13}}+h_{B_{14}})$ $b_3(h_{B_4}+h_{B_5}+h_{B_6}+h_{B_7})+b_2(h_{B_8}+h_{B_9}+h_{B_{10}}+h_{B_{11}})+b_1(h_{B_{12}}+h_{B_{13}}+h_{B_{14}})$ $b_3(h_{B_5}+h_{B_6}+h_{B_7}+h_{B_8})+b_2(h_{B_9}+h_{B_{10}}+h_{B_{11}}+h_{B_{12}})+b_1(h_{B_{13}}+h_{B_{14}})$ $b_3(h_{B_6}+h_{B_7}+h_{B_8}+h_{B_9})+b_2(h_{B_{10}}+h_{B_{11}}+h_{B_{12}}+h_{B_{13}})+b_1 h_{B_{14}}$ $b_3(h_{B_7}+h_{B_8}+h_{B_9}+h_{B_{10}})+b_2(h_{B_{11}}+h_{B_{12}}+h_{B_{13}}+h_{B_{14}})$ $b_3(h_{B_8}+h_{B_9}+h_{B_{10}}+h_{B_{11}})+b_2(h_{B_{12}}+h_{B_{13}}+h_{B_{14}})$ $b_3(h_{B_9}+h_{B_{10}}+h_{B_{11}}+h_{B_{12}})+b_2(h_{B_{13}}+h_{B_{14}})$ $b_3(h_{B_{10}}+h_{B_{11}}+h_{B_{12}}+h_{B_{13}})+b_2 h_{B_{14}}$ $b_3(h_{B_{11}}+h_{B_{12}}+h_{B_{13}}+h_{B_{14}})$ $b_3(h_{B_{12}}+h_{B_{13}}+h_{B_{14}})$ $b_3(h_{B_{13}}+h_{B_{14}})$ $b_3 h_{B_{14}}$

0.

As expected, the despread signal exactly reproduces the waveform of a signal as it would be obtained by transmitting sequences $\{a_0, a_1\}$ and $\{b_0, b_1, b_2, b_3\}$ using TDMA in time slots [3, 4] and [10, 11, 12, 13], respectively, corresponding to the codes allocated to transmitters A 210, $\{3, 4\}$, and B 230, $\{10, 11, 12, 13\}$. As such, it is possible to isolate the signal from user A and the signal from user B using demultiplexer 260 [step 362] for further processing.

Note that the symbol times corresponding to the "code gaps" $\{[1, 2], [5, 6]\}$ and $\{[8, 9], [14, 15]\}$ are used by the front and tail ends of the impulse response, while the symbol times corresponding to "code gaps" [6, 7] are "zero." In the case of time uncertainties between transmitters A and B with respect to the receiver 240, the received signals from A and from B "slide" independently in the vertical direction to thereby "occupy" the unused sample slots.

It is evident from the above that intersymbol interference (ISI) between signals received from transmitters A and B is eliminated. The fact that the output of the correlator 254 "reproduces" the signal as it would be transmitted using TDMA and the fact that there is no (i.e., zero) ISI between A and B demonstrates the orthogonality of the spreading/ despreading operation.

Once the signals have been isolated, via demultiplexer 260, each group of symbols may be further processed in a well-known manner. For example, the receiver 250 may accumulate the sampled signals from users A and B [step 364], determine a time-offset and a frequency-offset for each user [step 366], down sample and interpolate each user's signal using the time-offset [step 368], demodulate each user's signal using the frequency-offset [step 370], and re-generate the packets or continuous data stream from each user [step 372].

CONCLUSION

Systems and methods, consistent with the present invention, provide a mechanism by which interference in a spread spectrum, fiber optic communication system or in a "fiberless" over-the-air optical communication system may be reduced or even eliminated. A transmitter, consistent with the present invention, generates a spreading matrix. The transmitter spreads a data signal that is to be transmitted using one or more spreading codes from the spreading matrix. The spreading code format allows the transmitter to spread the data signal using a select-and-add operation. By using a despreading matrix that is the inverse (or pseudo-inverse) of the spreading matrix, interference in the optical network can be reduced and even eliminated.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 3A and 3B the order of the steps may be varied in other implementations consistent with the present invention. No element, step, or instruction used in the description of the present application should be construed as critical or essential to the invention unless explicitly described as such.

The following claims and their equivalents define the scope of the invention.

What is claimed is:

1. A method for processing a signal in an optical network, comprising:
    generating a spreading matrix, the spreading matrix comprising a plurality of spreading codes;
    spreading a signal using one or more spreading codes from the spreading matrix;
    converting the spread signal to an optical signal;
    transmitting the optical signal through the optical network;
    converting the optical signal back to the spread signal;
    generating a despreading matrix, the despreading matrix being an inverse of the spreading matrix and comprising a plurality of despreading codes;
    despreading the spread signal using one or more despreading codes from the despreading matrix; and
    processing the despread signal.

2. The method of claim 1 further comprising:
    selecting the one or more spreading codes from rows of the spreading matrix; and
    selecting the one or more despreading codes from columns of the despreading matrix.

3. The method of claim 1 wherein a row of the spreading matrix is a circular cyclic shift of a preceding row of the spreading matrix.

4. The method of claim 1 wherein the spreading matrix is a rectangular or square, non-invertible, matrix.

5. The method of claim 4 wherein the despreading matrix is a pseudo inverse of the spreading matrix.

6. The method of claim 1 wherein the spreading matrix contains only 1's and 0's.

7. The method of claim 6 wherein the spreading includes:
selecting portions of the signal in positions where the one or more spreading codes contain a 1, and
adding the selected portions.

8. The method of claim 1 wherein the spreading matrix is an arbitrary matrix of complex numbers.

9. The method of claim 1 wherein the optical network includes a fiber optic network.

10. The method of claim 1 wherein the optical network includes a fiberless, over-the-air, optical network.

11. The method of claim 1 wherein the generating a despreading matrix includes:
generating a despreading matrix that is proportional to one of an inverse or pseudo inverse of the spreading matrix.

12. A system for processing a signal in an optical network, comprising:
means for generating a spreading matrix, the spreading matrix comprising a plurality of spreading codes;
means for spreading a data signal using at least one spreading code from the spreading matrix;
means for transmitting the spread data signal through the optical network;
means for generating a despreading matrix, the despreading matrix being an inverse of the spreading matrix and comprising a plurality of despreading codes;
means for despreading the transmitted spread data signal using at least one despreading code from the despreading matrix; and
means for processing the despread signal.

13. A system for processing a signal in an optical communication network, comprising:
a transmitter configured to generate a spreading matrix comprising a plurality of spreading codes, select at least one spreading code from the spreading matrix, spread a signal using the at least one spreading code, convert the spread signal to an optical signal, and transmit the optical signal through the optical communication network; and
a receiver configured to receive the optical signal, convert the optical signal back to the spread signal, generate a despreading matrix, the despreading matrix being an inverse of the spreading matrix and comprising a plurality of despreading codes, select at least one despreading code from the despreading matrix, despread the spread signal using the at least one despreading code, and process the despread signal.

14. The system of claim 13 wherein, when selecting, the transmitter is configured to:
select the spreading code from a row of the spreading matrix, and
wherein, when selecting, the receiver is configured to:
select the despreading code from a column of the despreading matrix.

15. The system of claim 13 wherein a row of the spreading matrix is a circular cyclic shift of a preceding row.

16. The system of clam 15 wherein a column of the despreading matrix is a circular cyclic shift of a preceding column.

17. The system of claim 13 wherein the spreading and despreading matrices are of a rectangular or square, non-invertible, form.

18. The system of claim 17 wherein the despreading matrix is a pseudo inverse of the spreading matrix.

19. The system of claim 13 wherein the spreading matrix contains only 1's and 0's.

20. The system of claim 19 wherein, when spreading, the transmitter is configured to:
select portions of the signal in positions where the at least one spreading code contains a 1; and
add the selected portions.

21. The system of claim 13 wherein the transmitter is further configured to:
circularly extend the spreading matrix prior to spreading.

22. The system of claim 13 wherein, when generating, the receiver is configured to:
generate a despreading matrix that is proportional to the inverse or pseudo inverse of the spreading matrix.

23. The system of claim 13 wherein, when generating, the transmitter is configured to:
generate a spreading matrix comprising real-valued, non-negative values.

24. The system of claim 13 wherein, when generating, the transmitter is configured to:
generate a spreading matrix comprising complex values.

25. A method for processing signals transmitted in an optical communication system, the method comprising:
receiving an optical signal;
converting the optical signal into a digital signal;
generating at least one orthogonal despreading code, the at least one orthogonal despreading code being different than a code used to spread the optical signal, the spreading code being selected from a spreading matrix, the spreading matrix being one of a rectangular and a square, non-invertible, matrix;
despreading the digital signal using the at least one orthogonal despreading code; and
processing the despread signal, and
wherein the generating includes:
pseudo-inverting the spreading matrix to create a despreading matrix, and
selecting the at least one despreading code from a column of the despreading matrix that corresponds to the row of the spreading matrix.

26. A receiver that receives an optical signal transmitted in an optical communication network, the receiver comprising:
an optical converter configured to receive the transmitted optical signal and convert the optical signal to a digital signal;
a despreading code generator configured to generate at least one orthogonal despreading code, the at least one orthogonal despreading code being different than a code used to spread the transmitted optical signal, the spreading code being selected from a spreading matrix; and
a correlator configured to receive the digital signal and the at least one orthogonal despreading code, and despread the digital signal using the at least one orthogonal despreading code, and
wherein, when generating, the despreading code generator is configured to:
invert the spreading matrix to form a despreading matrix, and
select the at least one orthogonal despreading code from a column of the despreading matrix.

27. The receiver of claim 26 wherein the spreading matrix is one of a rectangular and square, non-invertible, matrix and wherein, when generating, the despreading code generator is configured to:

pseudo-invert the spreading matrix to form a despreading matrix, and select the at least one orthogonal despreading code from a column of the despreading matrix.

28. A system comprising:

a first optical transmitter configured to generate a spreading code matrix, rows of the spreading code matrix corresponding to different spreading codes, allocate a first group of spreading codes in the spreading code matrix to a first signal to be transmitted, spread the first signal using the first group of spreading codes, convert the spread first signal to an optical form, and transmit the optical first signal; and a second optical transmitter configured to generate the spreading code matrix, allocate a second different group of spreading codes in the spreading code matrix to a second signal to be transmitted, the second different group being allocated such that a third group of unassigned spreading codes is located between the allocated first group and second different group of spreading codes, spread the second signal using the second different group of spreading codes, convert the spread second signal to an optical form, and transmit the optical second signal.

29. The system of claim 28 wherein the second optical transmitter allocates the second different group of spreading codes such that a number of spreading codes in the third group corresponds to a time synchronization uncertainty factor.

30. The system of claim 28 wherein the first and second transmitters are further configured to circularly extend the spreading code matrix prior to the spreading.

31. The system of claim 28 wherein, when generating, the first and second optical transmitters are configured to: generate a spreading code matrix that contains only 1's and 0's.

32. The system of claim 31 wherein, when spreading, the first optical transmitter is configured to:

select portions of the first signal in positions where the first group of spreading codes contains a 1, and add the selected portions.

33. The system of claim 32 wherein, when spreading, the second optical transmitter is configured to:

select portions of the second signal in positions where the second different group of spreading codes contains a 1, and add the selected portions.

34. A method for transmitting optical signals, comprising:

generating a spreading code matrix, rows of the spreading code matrix corresponding to different spreading codes;

assigning a first group of spreading codes in the spreading code matrix to a first signal to be transmitted;

assigning a second different group of spreading codes in the spreading code matrix to a second signal to be transmitted, the second different group being assigned such that a third group of unassigned spreading codes is located between the assigned first group and second different group of spreading codes;

spreading the first signal using the first group of spreading codes;

spreading the second signal using the second different group of spreading codes;

converting the first and second signals to an optical format; and transmitting the first and second optical signals.

35. The method of claim 34 wherein the assigning the second different group includes:

assigning the second different group of spreading codes such that a number of spreading codes in the third group corresponds to a time synchronization uncertainty factor.

36. The method of claim 34 further comprising:

circularly extending, prior to assigning the first and second groups of spreading codes, the spreading code matrix.

* * * * *